United States Patent [19]
Eguchi et al.

[11] Patent Number: 4,868,120
[45] Date of Patent: Sep. 19, 1989

[54] METHOD OF RECOVERING BOTH SILVER AND A BASE FOR SENSITIVE MATERIALS FROM SENSITIVE MATERIALS BY UTILIZING MICRO-ORGANISMS

[75] Inventors: Kanemitsu Eguchi; Teruyuki Kanie, both of Nagoya, Japan

[73] Assignee: Zaidanhouzin Nagoyashi Kogyogijutsu Shinkokyokai c/o Nagoyashi Kogyo Kenkyujo, Nagoya, Japan

[21] Appl. No.: 335,406

[22] Filed: Dec. 29, 1981

[30] Foreign Application Priority Data

Aug. 21, 1981 [JP] Japan ................................. 56-131781

[51] Int. Cl.$^4$ .......................... C12P 3/00; C22B 11/00
[52] U.S. Cl. .................................. 435/262; 75/118 P; 435/168
[58] Field of Search ............... 435/173, 253, 168, 262; 75/118 R, 118 P

[56] References Cited

U.S. PATENT DOCUMENTS

| 1,065,115 | 6/1913 | Danzer | 435/262 X |
| 3,982,932 | 9/1976 | Korosi | 435/262 X |
| 4,150,977 | 4/1979 | Phillips | 75/118 R |
| 4,288,545 | 9/1981 | Spraker | |

FOREIGN PATENT DOCUMENTS

| 56-72139 | 6/1981 | Japan | 435/262 |
| 0588234 | 1/1978 | U.S.S.R. | 435/173 |

OTHER PUBLICATIONS

English Translation of "Zpracovani filovych odpadu." Chemicky Prumysl (Chemical Industry) Year 13/38 (1963), No. 4, pp. 180-183 by *Sramek*.

*Primary Examiner*—Robert J. Hill, Jr.
*Attorney, Agent, or Firm*—Armstrong, Nikaido, Marmelstein, Kubovcik & Murray

[57] ABSTRACT

Method of recovering both silver and a base in a reusable condition from sensitive material, such as a film or a photographic printing paper, having surfaces including gelatine and fine silver crystal, by utilizing microorganisms of a mixture of bacteria, including activated mutants of gelatin metabolic microbes.

10 Claims, 4 Drawing Sheets (1)   (3)

(2)   (4)

(1)

(3)

(2)

(4)

METHOD OF RECOVERING BOTH SILVER AND A BASE FOR SENSITIVE MATERIALS FROM SENSITIVE MATERIALS BY UTILIZING MICRO-ORGANISMS

BACKGROUND OF THE INVENTION

1. Field of the Invention

The present invention relates to a method of recovering both silver and a base for sensitive materials, such as photofilms and photoprinting papers, by utilizing micro-organisms, and more specifically to a method of recovering them from sensitive materials, such as photofilms and printing papers, which have a gelatin membrane on their surfaces containing fine silver crystals.

2. Description of the Prior Art

No methods are known to exists wherein both silver and a reutilizable base can be recovered from photofilms or photoprinting papers.

Therefore, methods have been adopted that only silver is recovered by incinerating photofilms or photoprinting papers. But these, methods have the problems of public nuisance, because the generation of offensive odor and dust will occur in disposing of the incinerated materials, and many chemical agents and processes are required in order to separate a pure silver from ashes, because ashes and silver are mixed in photofilms or photoprinting papers. There was another method of recovering silver from the surface of photofilms, in which a high concentration of sodium hydroxide was employed. In this method it was impossible to separate only silver by filtration, etc., because it was accompanied by an alkaline drainage, and several kinds of additives were mixed in gelatin membranes on the film to increase the efficiency of the films. Further, the recovery of a film base is impossible in this method.

On the other hand, the amount of such sensitive materials as used photofilms and photoprinting papers which should be disposed of, both for industrial and domestic uses, has recently increased. The surface of these films have gelatin membranes containing fine silver crystals. If silver and a reusable film were able to be recoverd from these sensitive materials which should be disposed of, it would be much advantageous to a sparing of resources or a countermeasure for public nuisance.

SUMMARY OF THE INVENTION

The invention relates to a method of recovering both silver and a base for sensitive materials, in a manner such that the materials such as films and photoprinting papers, the surfaces of which have gelatin membranes containing fine silver crystals, are exposed to a mist or a liquid, in which a mixture of bacteria is present containing aerobic or anaerobic activated mutants of gelatin metabolic microbes, and thus the gelatin membranes are degraded.

An object of the invention is to provide a method of recovering both silver and a reusable base for sensitive materials which have gelatin membranes containing fine silver crystals, therein utilizing biological reactions without any secondary public nuisance.

Another object of the invention is to provide a method that both silver and a base are recovered from sensitive materials, the surfaces of which have gelatin membranes containing fine silver crystals, in a manner such that the sensitive materials are disposed into a mist or a liquid in which a mixture of aerobic or anaerobic micro-organisms, containing activated mutants of gelatin metabolic microbes, are present, and then the membranes are degraded to separate silver from the materials.

A still further object of the invention is to provide a method that both silver and a base are recovered from sensitive materials, in a manner such that the materials, previously treated with hot water, are disposed into a mist or a liquid in which a mixture of micro-organisms is present, and then the membranes are degraded to separate silver from the materials.

A further object of the invention is to provide a method of recovering both silver and a base for sensitive materials, in a manner such that sensitive materials, on the surfaces of which have gelatin membranes containing fine silver crystals, are disposed into a mist or a liquid, in which a mixture of micro-organisms are present, simultaneously with irradiation with ultrasonic waves, and thus the membranes are degraded to separate silver.

DESCRIPTION OF THE PREFERRED EMBODIMENT

Figure 1:
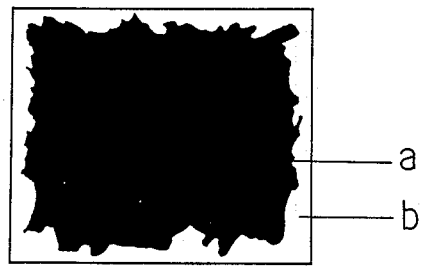
FIG. 1 shows the result of the process in one of the examples in which photofilms for Röntgen rays are treated with CLEAN TEAM.

The invention involves the degrading of gelatin membranes on sensitive materials, which have membranes containing fine silver crytals on their surfaces, using a mixture of aerobic or anaerobic micro-organisms which degrade organic compounds such as proteins, starches, fats and oils, and celluloses and, particularly, using activated mutants of gelatin metabolic microbes which take gelatin as a nutrient. In this specification, a gelatin metabolic microbe means one that prefers to eat organic gelatin and eliminates an inorganic silver out of the body without intake of it into the body. The activated mutant of gelatin metabolic microbe means bacteria which are artificially activated by irradiating with X-rays, $\alpha$-rays, $\gamma$-rays, or ultraviolet rays, etc.

In general when aerobic bacteria are employed,

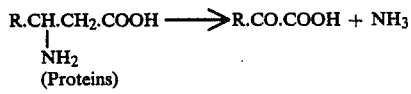
(Proteins)

or when anaerobic bacteria are employed,

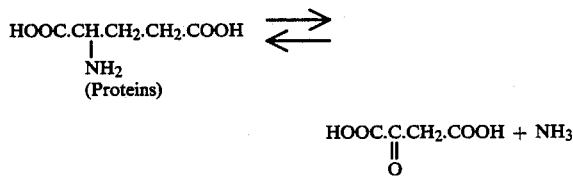
(Proteins)

gelatin will come to be biologically degraded according to the reactions shown above. Therefore, silver can be recovered from the surface of sensitive materials such as films and printing papers, etc., by contacting the materials with a liquid or a mist in which these micro-organisms are present.

Moreover, it is possible that a base for sensitive materials can be recovered without any damage, because Mylar film and a base for photoprinting papers will not be degraded by these bacteria. The base obtained is capable of being utilized as it is. The film is available as an additive for an ointment, because it forms fine flakes, when refrigerated and crushed into pieces.

Any protists are suitable as the micro-organisms which can be applied to the above reactions, so long as they can degrade proteins, starches, fats and oils, and celluloses, etc. But micro-organisms of significant high degradation power are preferable in order to obtain rapid industrial treatments.

Therefore, in the invention, several kinds of micro-organisms were mainly selected which prefer to eat gelatin on the surface of films or photoprinting papers, and further were mixed with protists such as protozoa and bacteria in order to allow them to have strong survival powers even under severe conditions.

Moreover, in order to increase process efficiency by rapidly shortening the time for the treatments, the activated mutant bacteria of gelatin were employed which were produced by an artificial variation with irradiation of special rays such as X-rays, $\alpha$-rays, $\gamma$-rays, and ultraviolet rays, etc.

In order to make the time for the treatments shorter, the sensitive materials can be given a treatment such that gelatin membranes can be efficiently degraded in a shorter time. For example, it is desirable to warm sensitive materials to allow the gelatin membrane to soften, to give hydrophilic properties to the membranes, or to give nutrients for micro-organisms (nitrogens, phosphates, and minerals, etc.) to the membranes.

The above treatments made it possible to degrade perfectly the membranes in about five to twenty minutes, although it may take several hours to days in the case that micro-organisms previously treated are not employed, as shown in the examples described later.

For separation methods of silver, there are natural sedimentation, separation by means of vibration, and mechanical separation (spray method and turning method), each of which can separate silver from a base on sensitive materials. The silver so separated is a black fine powder, which will give the possibility of obtaining a pulverized silver by a centrifugal method, a highly purified one by a simple electrolysis treatment, and also by a melting method at 1100° C.

Then, as described earlier, the micro-organisms employed in the invention are mainly composed of a gelatin metabolic microbe, to which protists such as protozoa and bacteria, etc., are added. The micro-organisms provide an effective management, because they have such a strong survival power and an increased durability that biological actions such as metabolism, growth, and proliferation can be carried out even under severe conditions.

Furthermore, a waste fluid consisting of these micro-organisms gives an effective countermeasure with respect to public nuisance, because it is harmless and can be drained off without any treatments.

A typical example of definite procedures in the invention is shown below, in the case that anaerobic micro-organisms are used for the treatment of films or photoprinting papers.

The first process:

Films or photoprinting papers are dipped into 1% of sodium phosphate solution at 80° to 90° C. for two to ten minutes.

Aims:
(a) to get gelatin softened with heat
(b) to give hydrophilic properties to gelatin
(c) to give nutrients to gelatin The second process:

The films or photoprinting papers treated with a hot water in the first process, are dipped onto a fluid for three to ten minutes in which micro-organisms are mixed (nearly at 35° C.).

Aims:
To degrade a gelatin layer

Third process:

The films or photoprinting papers, the second process of which was finished, are dipped into water. A silver is separated from films or bases on photoprinting papers in water by a vibration method or a mechanical method, etc. The silver obtained here is of a black fine powder. From the water containing the separated silver, a highly purified silver and a base can be recovered by the following procedures.

(1) The case of films 1-1) Recovery of silver (a) The chemical recovery of silver are carried out in the following steps.

1 The water obtained above are made to 0.4N of nitric acid solution.

2 The solution obtained is electrolysed, e.g., with +0.4V $V_s$ S. C. E. of a voltage at a cathode and 1.4 to 1.5V of a voltage between terminals.

By the electrolysis treatment, silver can be recovered in 99% of purity.

(b) The recovery of silver by a physical method is carried out in the following steps.

1 The water solution obtained above is dehydrated by centrifugation, etc., to recover a pulverized silver.

2 The pulverized silver recovered here, is heated and melted at 1100° C.

A silver mass can be obtained by this method.

(1-2) Recovery of a film base

Recovery of a film base is carried out in the following steps.

1 The film base, from which silver was separated, is dipped into 1% of sodium hypochlorite solution to be sterilized.

2 The film base sterilized is washed with water, followed by recovering a reusable film base.

(2) The case of photoprinting papers (2-1) Recovery of silver

The recovery method of silver from photoprinting papers is identical to that of silver from films by physical methods.

(2-2) Recovery of base on photoprinting papers

A base on photoprinting papers can be recovered only by washing it with water, from which silver was separated.

In the case of using aerobic micro-organisms, almost the same treatment is needed to be done in the air by a spray method as that in the case of using anaerobic micro-organisms. And also in the case of the sensitive materials other than films and photoprinting papers, either method described earlier is available.

Usefulness of the invention is explained by means of the following examples.

EXAMPLE 1

Photofilms for Röntgen rays (hereinafter refered to as films) were dipped into 1% suspension of commercially available bacteria (Toyo Clean Co., Ltd., brand name; CLEANTEAM) at 35° C. for fifteen minutes. Then, the films were taken out and placed in distilled water, followed by irradiating of the films with supersonic waves for two minutes to separate silver. As shown in FIG. 1, silver can only be partly separated (about 10%) under these conditions.

EXAMPLE 2

Figure 2:
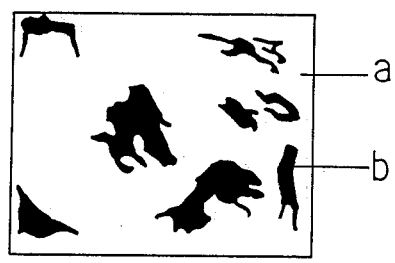
FIG. 2 shows the result of a process of one of the examples of the invention in which photofilms for Röntgen rays are treated with PERFECT CLEAN.

Films were dipped into a 1% suspension of PERFECT CLEAN (Sweeley Co., Ltd.) at 35° C. for fifteen minutes, which was employed as activated mutants of gelatin metabolic microbe. Then, the films were taken out and placed in distilled water, followed by irradiation with supersonic waves for two minutes to separate a silver. As shown in FIG. 2, a silver could be almost completely separated (about 99%).

EXAMPLE 3

Figure 3:
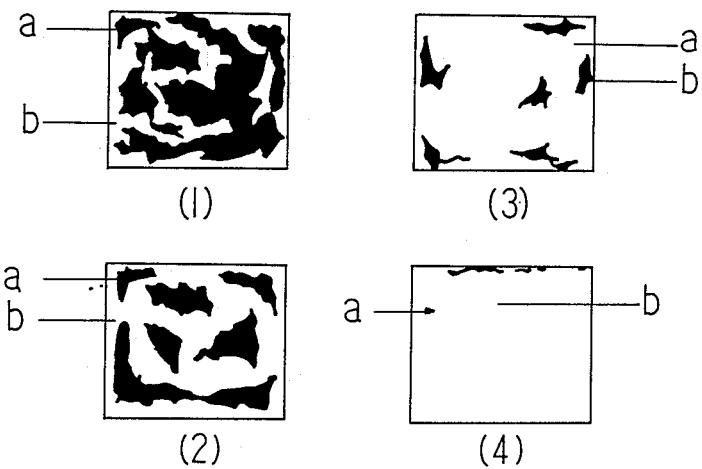
FIG. 3 shows the result of a process of one of the examples of the invention in which photofilms for Röntgen rays are treated with a hot water for different times, then with PERFECT CLEAN for different times; the times for these treatments are (1) one minute, and five minutes, (2) five minutes, and five minutes, (3) one minute, and ten minutes, and (4) five minutes, and ten minutes, respectively.

It becomes clear that the time for treatment can be shortened when films were degraded by micro-organisms, after they were previously dipped into a hot water so that the gelatin layers of them were softened. The films treated with a hot water were allowed to be dipped into the solution used in Example 2, and then were irradiated with supersonic waves for two minutes to separate silver. FIG. 3 shows the result that the times for the treatment of films with a hot water and PERFECT CLEAN are one minute and five minutes in (1), five minutes and five minutes in (2), one minute and ten minutes in (3), and five minutes and ten minutes in (4), respectively. The separation rates of silver were about 20%, 50%, 95%, and 100%, respectively.

EXAMPLE 4

Figure 4:
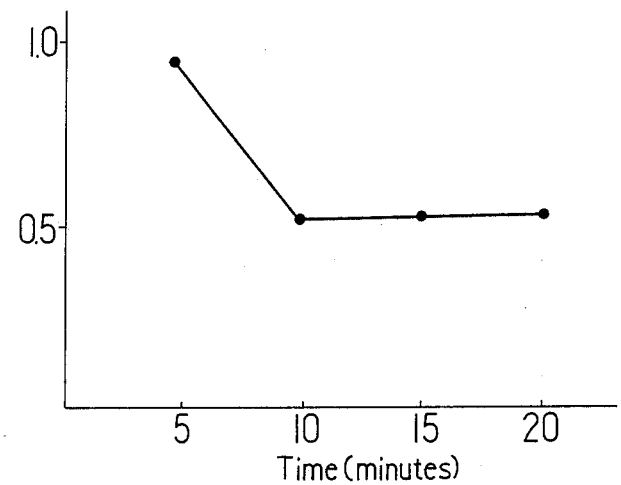
FIG. 4 shows the degradation rates of gelatin when the photofilms for Röntgen rays are treated with PERFECT CLEAN.

In order to verify the degradation time for gelatin layers, hourly changes in the amount of ammonium ions, i.e., degradation products, were measured. The result shown in FIG. 4 was obtained by measuring the amount of ammonium ions in the experiment described in Example 3. This figure makes it clear that the gelatin layers can be degraded in ten minutes.

Furthermore, it was also verified that if the films are treated to separate silver through irradiation with of supersonic waves and simultaneous treatment with micro-organisms, the effect of the activation of micro-organisms being depressed by silver is decreased, and then the time for treatment is shortened to about five minutes.

EXAMPLE 5

Figure 5:
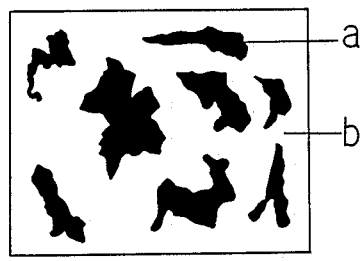
FIG. 5 shows the result of a process of one of the examples of the invention in which photofilms for Röntgen rays are treated with BARS BIO MIX-B.

As an activated mutant of gelatin metabolic microbe, BAR'S BIO-MIX-B(RELIANCE BROOKS Inc.) was employed. Films were dipped a into 1% suspension of the microbe at 35° C. for four minutes, and then placed in distilled water, followed by irradiation with supersonic waves for a minute to separate the silver. As shown in FIG. 5, about 90% of the silver could be separated.

EXAMPLE 6

Figure 6:
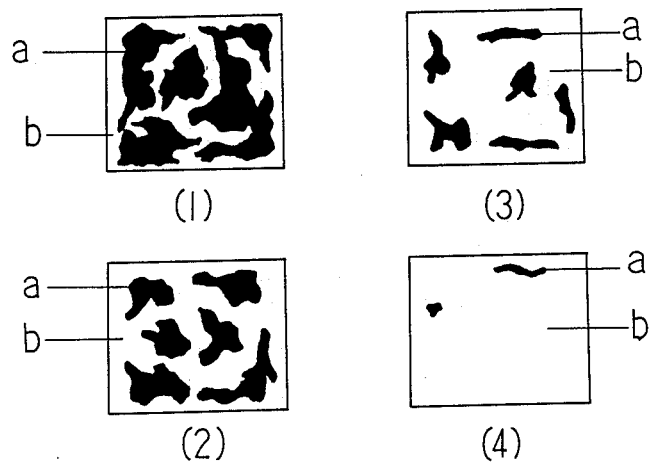
FIG. 6 shows the result of a process of one of the examples of the invention in which photofilms for Röntgen rays are treated with hot water for different times, then with BIO - MIX-B for different times; the times for the treatments with hot water and with BIO-MIX-B are (1) 15 seconds, and one minute and 30 seconds, (2) one minute and 15 seconds, and one minute and 15 seconds, (3) 15 seconds, and two minutes and 30 seconds, and (4) one minute and 30 seconds, and two minutes and 30 seconds, respectively.

Into the solution used in Example 5, films treated with a hot water were dipped and irradiated with supersonic waves to them to separate the silver. FIG. 6 shows the result that the treatments with hot water and with BARS'S BIO-MIX-B solution were carried out; (1) for fifteen seconds, and a minute and thirty seconds, (2) for a minute and fifteen seconds, and a minute and fifteen seconds. (3) for fifteen seconds, and two minutes and thirty seconds, (4) for a minute and thirty seconds, and two minutes and thirty seconds, respectively. The separation rates of the silver were 20%, 50%, 95%, and 100%, respectively.

EXAMPLE 7

Figure 7:
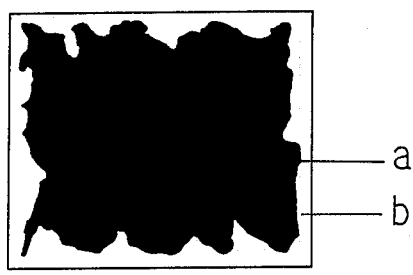
FIG. 7 shows the result of the process of one of the examples in which photoprinting papers are treated with CLEAN TEAM.

Photoprinting papers were dipped into a 1% suspension of commercially available bacteria (Toyo Clean Co. Ltd., Brand name; CLEANTEAM) at 35° C. for thirty minutes, and then placed in distilled water, followed by irradiation with supersonic waves for four minutes to separate silver. As shown in FIG. 7, silver could only be partly separated (about 10%) under these conditions.

EXAMPLE 8

Figure 8:
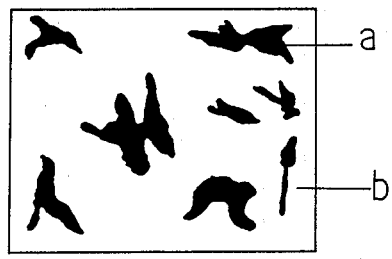
FIG. 8 shows the result of the process of one of the examples of the invention in which photoprinting papers are treated with PERFECT CLEAN.

As an activated mutant of gelatin metabolic microbe, PERFECT CLEAN (Sweeley Co. Ltd.) was employed. Photoprinting papers were dipped into a 1% suspension of it at 35° C. for thirty minutes, and then placed in distilled water, followed by irradiation with supersonic waves for four minutes to separate silver. As shown in FIG. 8, almost all of the silver could be separated (about 90%).

EXAMPLE 9

It was ascertained that the time for treatment could be shortened, if a gelatin layer in photoprinting papers were degraded by micro-organisms, after the layer was softened by previously dipping the photoprinting papers into a hot water.

Figure 9:
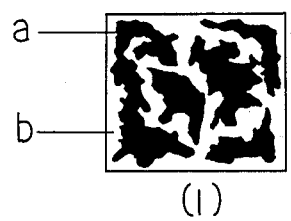
FIG. 9 shows the result of a process of one of the examples of the invention in which photoprinting papers are treated with hot water for different times, and then with PERFECT CLEAN for different times; the times for the treatments with hot water and with PERFECT CLEAN are (a) two minutes, and ten minutes, (b) ten minutes, and ten minutes, (c) two minutes, and 20 minutes, and (b) ten minutes, and 20 minutes, respectively.
Figure 9:
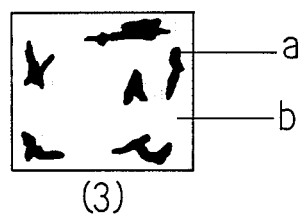
Figure 9:
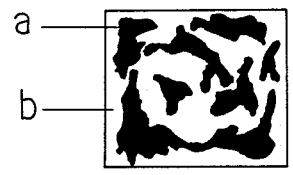
Figure 9:
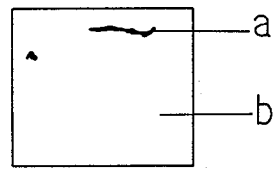

Into the solution used in Example 8, the photoprinting papers initially treated with a hot water were dipped, and then irradiated with supersonic waves for four minutes to separate silver. FIG. 9, shows the result that the treatment was carried out with a hot water and with PERFECT CLEAN; (1) for two minutes, and ten minutes, (2) for ten minutes, and ten minutes, (3) for two minutes, and twenty minutes, and (4) for ten minutes, and twenty minutes, respectively. The separation rates of silver were about 20%, 50%, 95% and 100%, respectively.

Figure 10:
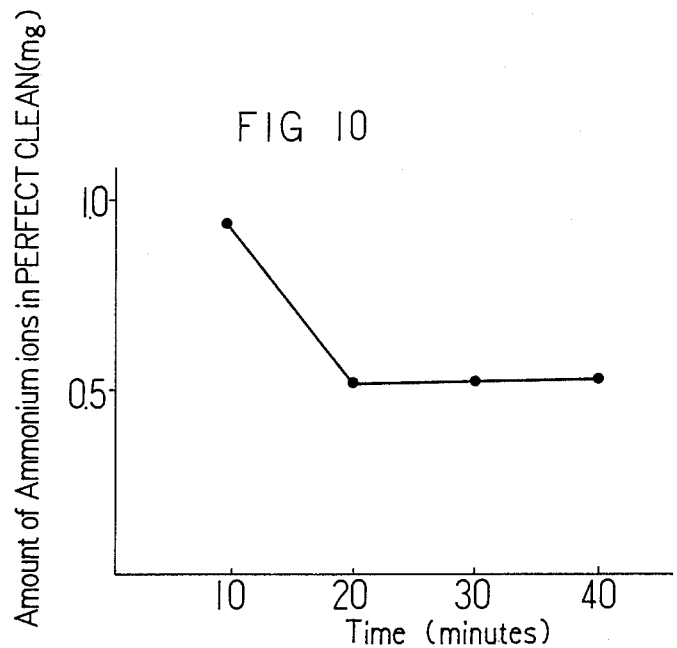
FIG. 10 shows the degradation rates of gelatin when photoprinting papers are treated with PERFECT CLEAN.

In order to ascertain the degradation time of gelatin layers, hourly changes in the amount of ammonium ions, i.e. degradation products, were measured. The results shown in FIG. 10 were obtained by measuring the amount of ammonium ions during the experiment described in Example 9. From this figure, it is evident that the ions can be degraded in about twenty minutes.

Futhermore, it was also ascertained that if photoprinting papers, similar to the case of films, were treated to separate silver through irradiation with supersonic waves and simultaneous treatment with micro-organisms, the effect of the activation of micro-organisms being depressed by silver is decreased, and further the time for treatment is decreased about 50%.

EXAMPLE 10

Figure 11:
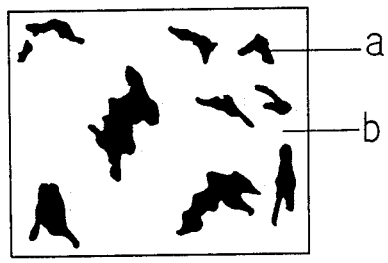
FIG. 11 shows the result of a process of one of the examples of the invention in which photoprinting papers are treated with BARS'S BIO-MIX-B.

As an activated mutant of gelatin metabolic microbe, BARS'S BIO-MIX-B (RELIANCE BROOKS INC.) was employed. Photoprinting papers were dipped into a 1% suspension of it at 35° C. for five minutes and ten seconds and then placed in distilled water, followed by irradiation with supersonic waves for one minute to separate the silver. As shown in FIG. 11, about 90% of silver could be separated.

EXAMPLE 11

Figure 12:
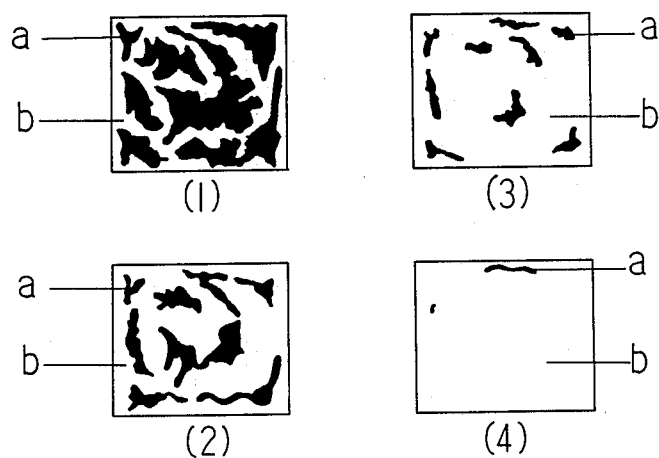
FIG. 12 shows the result of a process of one of the examples of the invention in which photoprinting papers are treated with hot water, and then with BARS'S BIO-MIX-B for different times; the times for the treatments with hot water and with BAR'S BIO-MIX-B are (a) 20 seconds, and two minutes, (b) one minute and 30 seconds, and one minute and 30 seconds, (c) 20 seconds, and three minutes and 15 seconds, and (d) two minutes, and three minutes and 15 seconds, respectively.

Into the solution used in Example 10, photoprinting papers treated with hot water were dipped, and then irradiated with supersonic waves for one minute to separate silver. FIG. 12 shows the result that the photoprinting papers were treated with hot water and with BAR'S BIO-MIX-B; the times for these treatments were (1) twenty seconds, and two minutes, (2) one minute and thirty seconds, and one minute and thirty seconds, (3) twenty seconds, and three minutes and fifteen seconds, and (4) two minutes, and three minutes and fifteen seconds, respectively. The separation rates of silver were about 20%, 50%, 95% and 100%, respectively.

In comparative experments between PERFECT CLEAN and BAR'S BIO-MIX-B, the following results were obtained.

The experiments were carried out in such a way that films for photographs or photoprinting papers of 2×2 cm in size were placed in 25 ml of distilled water at 25° C. containing 1 g of the bacteria. The distilled water and bacteria were contained in two 200 ml beakers which were vibrated by supersonic waves.
  (1) The case of films for photographs
    (a) When PERFECT CLEAN was employed, the separation of silver was finished in sixty seconds.
    (b) When BARS'S BIO-MIX-B was employed, the separation of silver was finished in fifteen minutes.
  (2) The case of photoprinting papers
    (a) When PERFECT CLEAN was employed, the separation of silver was finished in eighty minutes.
    (b) When BARS'S BIO-MIX-B was employed, the separation of silver was finished in twenty minutes.

From these results, it shown that BAR'S BIO-MIX-B degraded a gelatin about four times as rapidly as PERFECT CLEAN, because BAR'S BIO-MIX-B is a mutant bacterium which degrades only proteins.

It was also shown that the separation rates of silver on photoprinting papers were slower by about 30% than those of silver on films for photographs, because the gelatin layers on photoprinting papers are thicker than those on films for photographs, or subjected to a strong adherence treatment.

What is claimed is:

1. A method for recovering both silver and sensitive material base from sensitive material having a surface of a gelatin membrane including fine silver crystals, said method comprising the steps of
  (a) treating the sensitive material in an aqueous solution of 1% phosphate at a temperature of 80°–90° C.;
  (b) exposing said sensitive material to a mist containing aerobic bacteria including activated mutants of gelatin metabolic microbes and degrading the gelatin membrane; and
  (c) separating silver and sensitive material base from the sensitive material after the degradation of the gelatin membrane.

2. The method for recovering both silver and sensitive material base from sensitive material according to claim 1, wherein the step of separating the silver and sensitive material base and the step of degrading the gelatin membrane are carried out simultaneously by irradiating the sensitive material with supersonic waves as it is being exposed to said mist.

3. A method for recovering both silver and sensitive material base from sensitive material having a surface of a gelatin membrane including fine silver crystals, said method comprising the steps of
  (a) treating the sensitive material in an aqueous solution of 1% phosphate at a temeperature of 80°–90° C.;
  (b) exposing said sensitive material to a liquid containing aerobic bacteria including activated mutants of gelatin metabolic microbes and degrading the gelatin membrane; and
  (c) separating silver and sensitive material base from the sensitive material after the degradation of the gelatin membrane.

4. The method for recovering both silver and sensitive material base from sensitive material according to claim 3, wherein the step of separating the silver and sensitive material base and the step of degrading the gelatin membrane are simultaneously performed by irradiating the sensitive material with supersonic waves as it is being exposed to said liquid.

5. A method for recovering both silver and sensitive material base from sensitive material having a surface of a gelatin membrane including fine silver crystals, said method comprising the steps of
   (a) treating the sensitive material in an aqueous solution of 1% phosphate at a temperature of 80°-90° C.;
   (b) exposing said sensitive material to a mist containing anaerobic bacteria including activated mutants of gelatin metabolic microbes and degrading the gelatin membrane; and
   (c) separating silver and sensitive material base from the sensitive material after the degradation of the gelatin membrane.

6. The method for recovering both silver and sensitive material base from sensitive material according to claim 5, wherein the step of separating the silver and sensitive material base and the step of degrading the gelatin membrane are carried out simultaneously by irradiating the sensitive material with supersonic waves as it is being exposed to said mist.

7. A method for recovering both silver and sensitive material base from sensitive material having a surface of a gelatin membrane including fine silver crystals, said method comprising the steps of
   (a) treating the sensitive material in an aqueous solution of 1% phosphate at a temperature of 80°-90° C.;
   (b) exposing said sensitive material to a liquid containing anaerobic bacteria including activated mutants of gelatin metabolic microbes and degrading the gelatin membrane; and
   (c) separating silver and sensitive material base from the sensitive material after the degradation of the gelatin membrane.

8. The method for recoverin both silver and sensitive material base from sensitive material according to claim 7, wherein the step of separating the silver and sensitive material base and the step of degrading the gelatin membrane are simultaneously performed by irradiating the sensitive material with supersonic waves as it is being exposed to said liquid.

9. The method according to any one of claims 1, 2, 3, 4, 5, 6, 7 or 8, wherein the sensitive material is a film.

10. The method according to any one of claims 1, 2, 3, 4, 5, 6, 7 or 8, wherein the sensitive material is a photographic printing paper.

* * * * *